(12) United States Patent
Callaghan et al.

(10) Patent No.: US 8,156,232 B2
(45) Date of Patent: Apr. 10, 2012

(54) NETWORK COMMUNICATIONS IN AN INDUSTRIAL AUTOMATION ENVIRONMENT

(75) Inventors: David M. Callaghan, Concord, OH (US); Scot A. Tutkovics, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1593 days.

(21) Appl. No.: 11/224,210

(22) Filed: Sep. 12, 2005

(65) Prior Publication Data

US 2007/0061018 A1    Mar. 15, 2007

(51) Int. Cl.
G06F 15/16    (2006.01)
(52) U.S. Cl. .......................................... 709/230; 700/83
(58) Field of Classification Search ................. 709/220, 709/221, 222
See application file for complete search history.

(56) References Cited

U.S. PATENT DOCUMENTS

| | | | |
|---|---|---|---|
| 6,201,996 B1 * | 3/2001 | Crater et al. ...................... 700/9 |
| 6,529,515 B1 * | 3/2003 | Raz et al. ...................... 370/401 |
| 6,546,419 B1 * | 4/2003 | Humpleman et al. ........ 709/223 |
| 6,793,127 B2 | 9/2004 | Alsafadi et al. |
| 6,920,502 B2 * | 7/2005 | Araujo et al. ................. 709/229 |
| 7,003,304 B1 * | 2/2006 | Helferich ...................... 455/458 |
| 7,134,090 B2 * | 11/2006 | Kodosky et al. .............. 715/769 |
| 7,313,608 B1 * | 12/2007 | Swedor et al. ................ 709/221 |
| 7,490,293 B1 * | 2/2009 | Humpleman et al. ........ 715/734 |
| 7,689,678 B2 * | 3/2010 | Yip et al. ...................... 709/221 |
| 8,060,930 B2 * | 11/2011 | Lovat et al. ...................... 726/19 |
| 2002/0046239 A1 | 4/2002 | Stawikowski et al. |
| 2002/0161827 A1 | 10/2002 | Brault |
| 2003/0014500 A1 | 1/2003 | Schleiss |
| 2003/0061274 A1 * | 3/2003 | Lo ................................. 709/203 |
| 2004/0028049 A1 * | 2/2004 | Wan .............................. 370/394 |
| 2004/0039964 A1 | 2/2004 | Russell et al. |
| 2004/0088391 A1 | 5/2004 | Ascoli et al. |
| 2004/0111512 A1 * | 6/2004 | Barth ............................ 709/224 |
| 2004/0114591 A1 | 6/2004 | Naismith et al. |
| 2004/0268186 A1 * | 12/2004 | Maturana et al. ............... 714/38 |
| 2005/0021709 A1 * | 1/2005 | Canali et al. .................. 709/223 |
| 2005/0257195 A1 * | 11/2005 | Morrow et al. ............... 717/109 |
| 2006/0028650 A1 * | 2/2006 | Crickmore et al. ........... 356/479 |

(Continued)

FOREIGN PATENT DOCUMENTS

EP    1376281 A1    1/2004

OTHER PUBLICATIONS

International Search Report & Written Opinion dated Jul. 28, 2008 for PCT Application Serial No. PCT/US06/34900, 14 Pages.

(Continued)

*Primary Examiner* — Peter-Anthony Pappas
*Assistant Examiner* — Ninos Donabed
(74) *Attorney, Agent, or Firm* — Turocy & Watson, LLP; Scott Speroff; John M. Miller

(57) ABSTRACT

An industrial automation device comprises a reception component that receives a request for data resident within the industrial automation device. An encoding component communicatively coupled to the reception component that receives a binary bit stream associated with the request and encodes a payload of the bit stream as XML data, the encoding component further communicates the encoded payload by way of an industrial automation protocol. Furthermore, the industrial automation device can include a compression component that compresses the XML data.

25 Claims, 14 Drawing Sheets

U.S. PATENT DOCUMENTS

| | | | | |
|---|---|---|---|---|
| 2006/0031540 | A1* | 2/2006 | Purontaus et al. | 709/229 |
| 2006/0040243 | A1* | 2/2006 | Celiant | 434/245 |
| 2006/0265689 | A1* | 11/2006 | Kuznetsov et al. | 717/117 |
| 2007/0168060 | A1* | 7/2007 | Nixon et al. | 700/83 |

OTHER PUBLICATIONS

Wollschlaeger M, et al., "Web integration of factory communication systems using an XML framework". Industrial Electronics, 2002. ISIE 2002. Proceedings of the 2002 IEEE International Symposium on Jul. 8-11, 2002, Piscataway, NJ, USA, IEEE, vol. 1, Jul. 8, 2002, pp. 146-151, XP010598161, ISBN: 978-0-7803-7369-3.

Wollschlaeger M, et al., "XML based description model as a platform for web-based maintenance". Industrial Informatics, 2004. Indin' 04. 2004 2nd IEEE International Conference on Berlin, Germany Jun. 24-26, 2004, Piscataway, NJ, USA, IEEE, Jun. 24, 2004, pp. 125-130, XP010782616, DOI: DOI: 10.11.1109/INDIN.2004.1417315, ISBN: 978-0-7803-8513-9.

Trygve Lunheim, et al., : "An experimental setup for vertical integration in network systems for industrial use". 2nd International Workshop on Real-Time LANs in the Internet Age, Jul. 1, 2003, XP002630636, Porto, Portugal. URL: http://www.hurray.isep.ipp.pt/rtlia2003/rtlia_program.html. Last accessed on Mar. 25, 2011.

European Search Report for EP Application No. 06803126.9-1239 / 1932064, dated May 9, 2011, 4 pages.

* cited by examiner

NETWORK COMMUNICATIONS IN AN INDUSTRIAL AUTOMATION ENVIRONMENT

TECHNICAL FIELD

The subject invention relates generally to industrial control systems and, more particularly, to communications in an industrial automation environment.

BACKGROUND

Due to advances in computing technology, businesses today are able to operate more efficiently when compared to substantially similar businesses only a few years ago. For example, networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, drive actuators, respond to data in real-time, and other various procedures that relate to automating a process.

To effectuate suitable industrial automation, many enterprises utilize a plurality of disparate networks designed for industrial automation to communicate data between components within an industrial setting. In more detail, networking protocols conventionally employed for personal computers in an office or home environment are often insufficient for an industrial setting, as real-time receipt and processing of data is typically required in industrial settings. Accordingly, various protocols for industrial environments have been designed for utilization in industrial environments, and application layer protocols have also been designed thereon to enable communication of data across disparate industrial protocols.

While various technical advancements have been made with respect to generating and transferring data over disparate industrial protocols, interpreting and utilizing such data remains a difficult and tedious task. For example, standards have been introduced to assist in classification of data. More particularly, a first set of bits can indicate class, a second set of bits can indicate instance, a third set of bits can indicate a particular attribute, and a fourth set of bits can indicate a service associated with the data. The data, however, cannot be interpreted without extensive knowledge of the standard. Thus, an individual without immediate access to the standard cannot review data associated with a device and determine meaning of such data, much less utilize the data for a desired application. Furthermore, many standards associated with industrial data include optional attributes—thus, if a particular attribute is not desired by a first developer, such developer may place zeros at the point within a byte stream associated with the attribute. A second developer may, however, simply skip such portion within the byte stream. Therefore, it can be discerned that it can be nearly impossible to determine meaning of data associated with an industrial control device without documentation such as source code or design specifications for each application object version of interest.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter described herein relates to encoding and communication of data that is resident within an industrial automation environment. An industrial automation device, such as a programmable logic controller, can include data (software objects, etc.) that is associated with a predefined classification. It is often difficult, however, to discover meaningful information relating to such data without substantial knowledge of the classification scheme. Thus, conventionally a binary stream of data is provided to a user, and the user has no mechanism for determining meaning of such data. To make up for such deficiencies, a public attribute can be automatically attached to a request for data, causing return of a stream of text that describes the classification system. At least a portion of the binary bit stream and/or at least a portion of the text can be encoded as an XML payload, and thereafter communicated over an industrial automation protocol, such as DeviceNet, ControlNet, EtherNet/IP, Hart, Foundation Fieldbus, ModBus, Control and Information Protocol, and the like. The XML-encoded payload or derivatives can then be provided to a user by way of a graphical user interface or human-machine interface. Industrial automation devices that utilize conventional classification schemes can thus include discoverable data without forcing implementation of an entirely new classification scheme or design of an entirely new protocol. Moreover, to alleviate bandwidth demands, at least a portion of the XML-encoded payload can be compressed prior to communication of the data over the industrial automation protocol or include binary attachments.

An industrial automation communications network is also described herein, wherein XML data can be communicated over a Control and Information Protocol (CIP) communication medium. In more detail, an industrial automation device can be coupled to a CIP communication medium, which can be cabling, wireless mechanisms, or the like. The CIP communication medium can then be employed to transmit XML data relating to the industrial automation device. For instance, the industrial automation device can be programmed by way of the XML data. Furthermore, the XML data can be delivered as a SOAP message with a MIME attachment or a binary attachment, thereby allowing data not formatted in accordance with ASCI II to be transmitted by way of CIP. Furthermore, the industrial automation device can be provided with a schema that is discoverable by a remote client device, thus facilitating testing and validation of data from within the industrial automation device. Furthermore, CIP interfaces appended to data transmitted by way of such protocol and/or existent within an industrial automation device and/or remote device can be wrapped with web services.

Moreover, several security mechanisms can be employed with various aspects of the claimed subject matter described herein. For instance, an initiator of a request for data can be prompted for security information, such as a user name, a password, a personal identification number, and the like. Similarly, an entity or device requesting data can be prompted for a network address, unique identifier, or other suitable data that enables verification of user identity. Disparate permission levels can be assigned to different users/entities, and access to internal components can be mapped to different permission groups thereby providing an additional level of security for data within an industrial automation environment.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
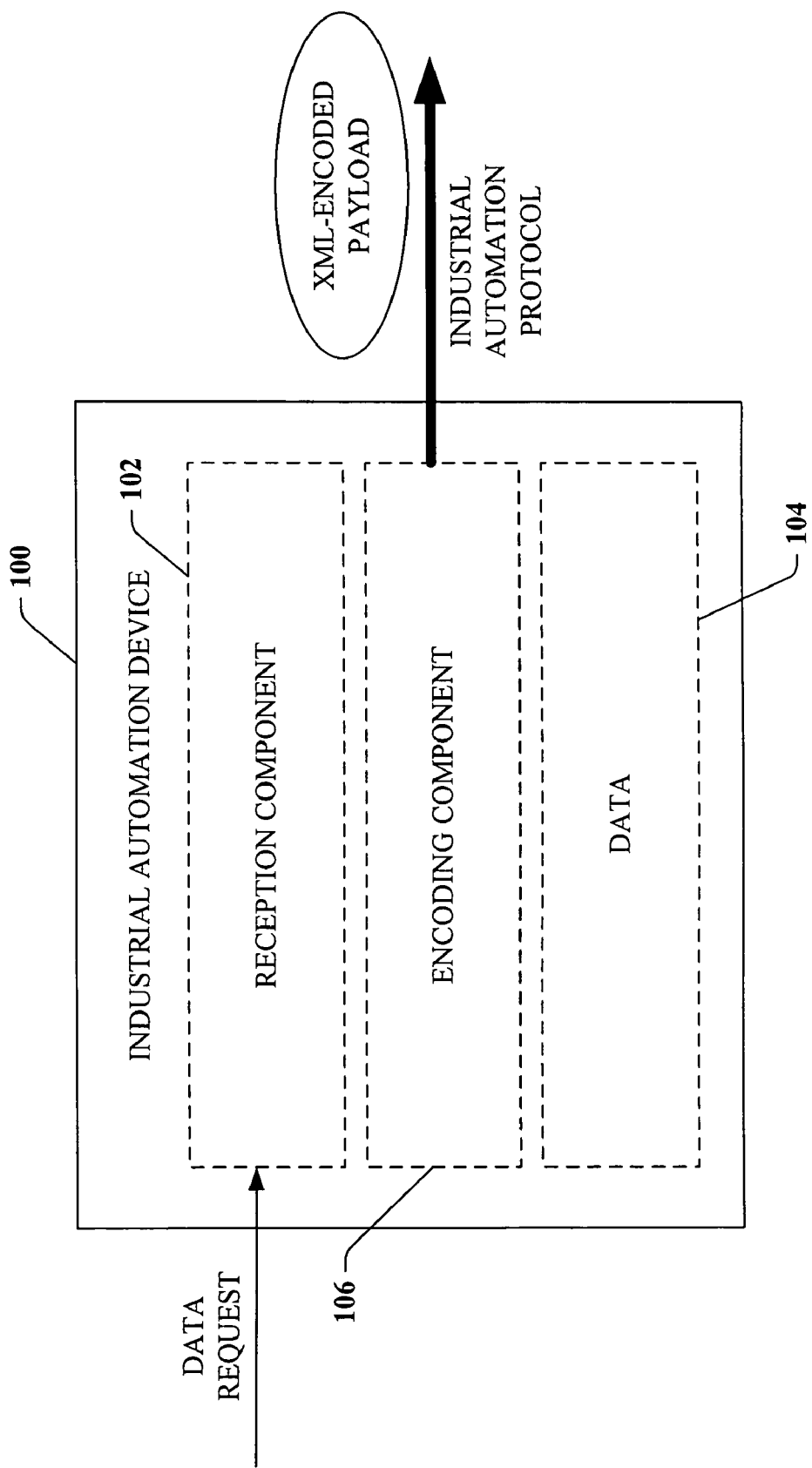
FIG. 1 illustrates an industrial automation device that can encode binary data and/or text data as an XML-encoded payload.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer/processing device to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now referring to the drawings, FIG. 1 illustrates an industrial automation device 100 that can encode at least a portion of a binary bit stream into an XML payload. In more detail, the industrial automation device 100 includes a reception component 102 that receives a data request. For instance, the data request can be initiated by an operator or other individual or from a disparate device, such as an industrial automation device, a remote computing device, etc. Furthermore, the data request can be automatically generated and/or manually generated. For example, if an operator desires to discover content of the industrial automation device (e.g., which software objects were supported and/or existent within the industrial automation device 100, which version of a software object is existent within the device, . . . ), such operator can manually enter a command such as "GET" (or other suitable command). In another example, a computer that is generating a graphical user interface and/or human-machine interface (HMI) can automatically query the industrial automation device 100 and retrieve data associated with such interface(s).

Upon the reception component 102 receiving the data request, data 104 within the industrial automation device 100 can be accessed and presented as a binary bit stream to an encoding component 106, which can encode at least a portion of the binary bit stream as an XML payload 108. In still further detail, the industrial automation device 100 can include objects associated with a particular classification system, so that the data is modeled. For instance, objects can be related to class-level attributes, instance-level attributes, and the like. This modeled data, however, is often not discoverable, as many features in classification systems can be optional—thus, an individual without significant knowledge with respect to the classification system will not be able to discover content of the industrial automation device 100. Rather, the individual will receive a string of binary information which can easily be misinterpreted. Accordingly, the encoding component 106 can be responsive to a public attribute (e.g., a class attribute) that returns a stream of text that is a schema for a requested object. The encoding component 106 can then encode such stream of text as at least a portion of the XML payload 108 and deliver the XML payload 108 to the requesting entity over an industrial automation protocol. Further, the XML payload can include human readable meta information about the data provided, such as alias or description of the resource, accuracy or precision, sampling rate, device uptime, scheduled maintenance, performance utilization, available resources for example, etc.

Accordingly, the industrial automation device 100 is discoverable by an entity that does not have substantial knowledge of a classification structure. For instance, an entity can request data from the industrial automation device 100, and the encoding component 106 can receive a binary bit stream as well as a stream of text associated with such binary bit stream. The encoding component 106 can then encode at least a portion of the binary bit stream (and at least a portion of the text stream) into the XML payload 108. This XML-encoded payload 108 can then be delivered to the requesting entity and/or an intermediary to such requesting entity by way of the industrial automation protocol.

The industrial automation device 100 can be any suitable device with sufficient memory and processing capabilities to encode a binary bit stream and/or associated text as an XML payload. In one particular example, the industrial automation device 100 can be a programmable logic controller, which is a small computing device used for automation of real-world processes, such as control of machinery on factory assembly lines. Where older automated systems would use hundreds or thousands of relays and cam timers, a single PLC can be programmed as a replacement. A programmable logic controller can include either modular or integral input/output circuitry that can monitor status of field connected sensor inputs and control attached devices (motor starters, solenoids, pilot lights/displays, speed drives, valves, . . . ) according to a user-created program stored in memory. It is understood, however, that the industrial automation device 100 can be any suitable device associated with an industrial process that includes sufficient processing and memory capabilities to store and implement software objects. In still another example, the industrial automation device 100 can be a switch, a router, a gateway, a bridge, a proxy, or other suitable network hardware device. Furthermore, these network devices can include functionality conventionally associated with programmable logic controllers.

With respect to the industrial automation protocol, such protocol can be any suitable protocol designed for employment within an industrial setting. For example, DeviceNet, ControlNet, EtherNet/IP, Modbus, Profibus, and Foundation Fieldbus are exemplary industrial automation protocols. One or more of these protocols can be based at least in part upon the Control and Information Protocol (CIP), which can be an application layer protocol for one or more of the aforementioned industrial automation protocols. It is understood, however, that any of such protocols or combination of protocols are contemplated and intended to fall under the scope of the hereto-appended claims.

Figure 2:
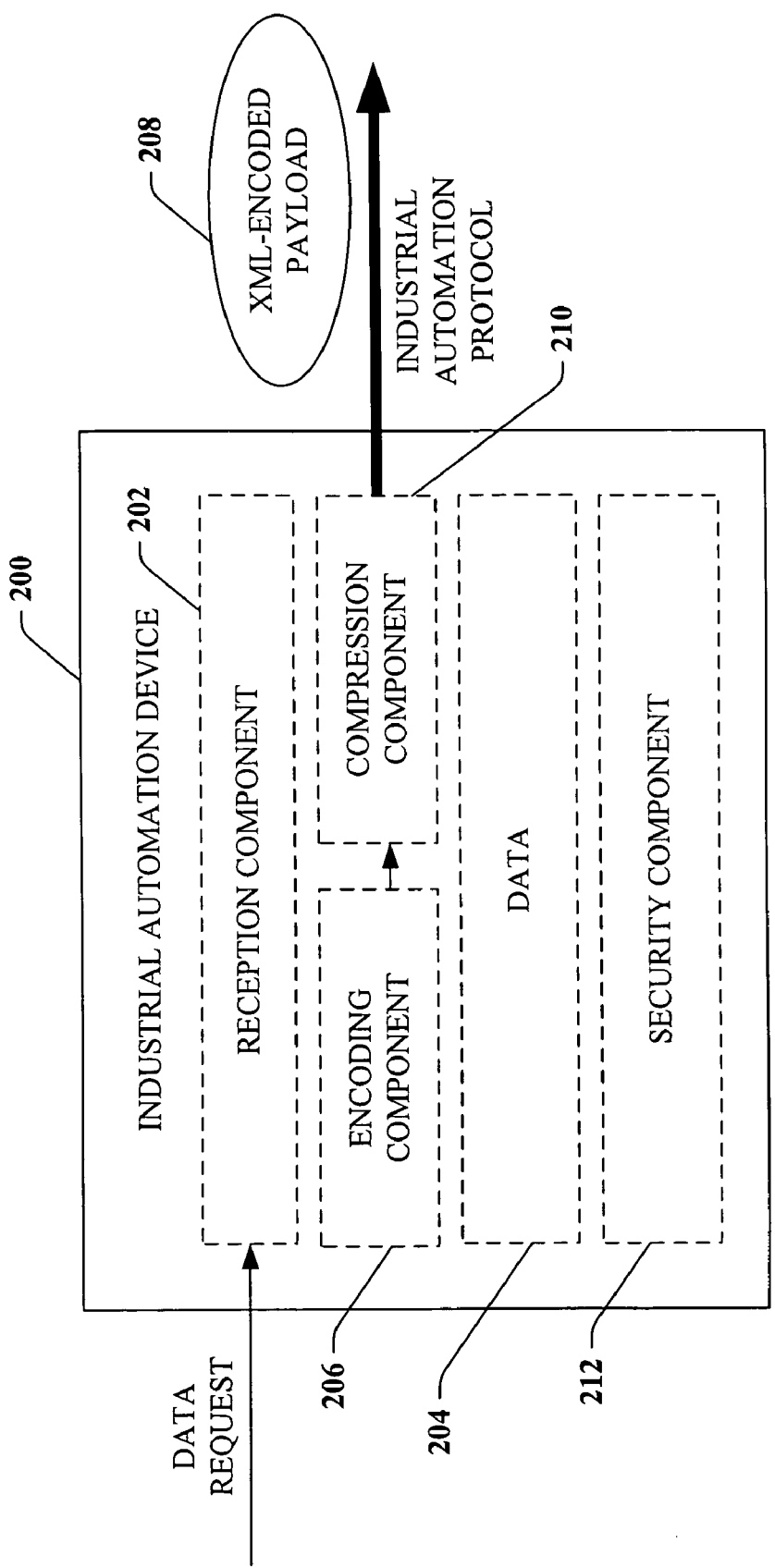
FIG. 2 illustrates an industrial automation device that can deliver compressed XML over an industrial automation protocol.

Now referring to FIG. 2, an industrial automation device 200 that can encode at least a portion of a binary bit stream into an XML payload is illustrated. The industrial automation device 200 includes a reception component 202 that receives a request for data 204 within the industrial automation device. A binary bit stream can be generated by the industrial automation device 200 upon receipt of the data request by the reception component 202, and such bit stream can be received by an encoding component 206. Furthermore, the reception component can obtain a text string from within the data 204 that is associated with an attribute referenced in the data request. For instance, the text string can describe the classification and/or schema associated with one or more software objects referenced by the data request. Accordingly, content of the industrial automation device 200 can be discoverable by one that is unfamiliar with a classification scheme associated with the industrial automation device 200.

The encoding component can receive the binary bit stream and/or the text string and encode such data as an XML payload 208. Also it should be appreciated that a device may provide multiple XML documents including Extensible Style Sheets (XSLT) or Cascading Style Sheets (CSS) which are available via a URL, URI and the like. Therefore, data within the XML-encoded payload can be viewed and/or modified by way of a conventional browser. While not shown, it is to be further understood that any suitable parsing component/algorithm can be employed in connection with determining a structure of the aforementioned binary bit stream and the text string. Further, a parsing component (not shown) can be existent at a client device that receives the XML-encoded payload 208, thereby enabling review by a requestor of the data 204. Moreover, while not explicitly displayed, the industrial automation device 200 can receive data in XML over the industrial automation protocol. For example, a user can generate a program in XML and deliver such program to the industrial automation device 200 by way of the industrial automation protocol. A processor (not shown) within the industrial automation device 200 and memory associated therewith can then be updated. For instance, a parsing component can be included within the industrial automation device 200, wherein the parsing component parses received XML data and passes the XML data to a processor/memory. Similarly, a proxy can be employed to parse the XML data and provide the industrial automation device with data of a format that the industrial automation device 200 can implement.

Prior to being communicated to a disparate device and/or user by way of an industrial automation protocol, XML data can be subject to a compression component 210 that compresses the XML data to facilitate reduction of use of available bandwidth. The compression component 210 can employ any suitable compression scheme—for instance, the compression scheme can be lossless or lossy, depending upon an application and/or user. Moreover, data delivered over the industrial automation protocol can be subject to encryption to facilitate security of the data.

The industrial automation device 200 can further include a security component that is employed to ensure that unauthorized users/entities and/or users/entities without requisite permissions are unable to access and or alter the data 204 within the industrial automation device 200. For example, the security component 212 can include or access usernames, passwords, personal identification numbers (PINs), or other data that can identify a user, a device, an object, or the like. Furthermore, the security component 212 can interface with smart cards or receive biometric indicia, such as a voice sample, a fingerprint, a retina scan, or the like, and determine an identity of a user as well as access privileges associated with such user. While shown as being internal to the industrial automation device 200, it is to be understood that the security component 212 can exist in any suitable device that is communicatively coupled to the industrial automation device 200. For example, the security component 212 can exist within a server that provides security services to a plurality of industrial automation devices (not shown).

Figure 3:
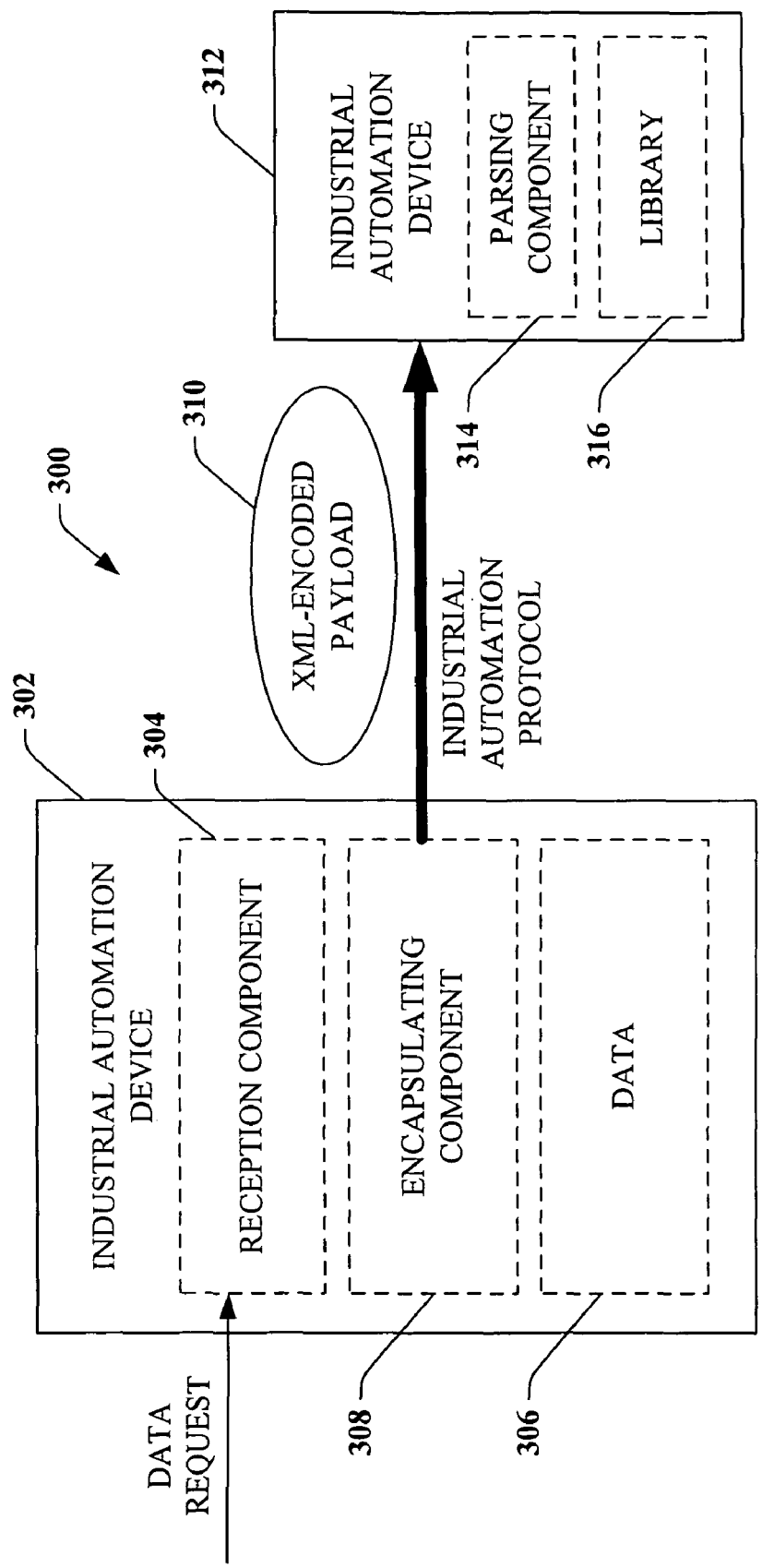
FIG. 3 illustrates a system that facilitates transmittal of XML-encoded data between industrial automation devices by way of an industrial automation protocol.

Now referring to FIG. 3, a system 300 that facilitates transfer of XML data between disparate industrial automation devices in an industrial automation environment is illustrated. The system 300 includes an industrial automation device 302 that comprises a reception component 304 configured to receive data requests. Upon receipt of the data request by the reception component 304, the industrial automation device 302 can access a data repository 306 therein and cause a binary bit stream to be delivered to an encoding component 308. The encoding component 308 can further access a text stream that describes a classification scheme of data within the data repository 306 upon receipt of the binary bit stream. The encoding component 308 can then encode at least a portion of the binary bit stream and the text stream as an XML payload and communicate such payload 310 over an industrial automation protocol to a disparate industrial automation device 312. The industrial automation device 312 can include a parsing component 314 that parses the XML data 310 to determine structure of such data. The parsing component 314 can utilize a standard library 316, which can be incorporated directly within the industrial automation device. By encoding binary data as the XML payload 310 and communicating it across a conventional industrial automation protocol, a custom parsing tool is not necessary, as the XML-encoded payload 310 can be parsed using a standard library.

Figure 4:
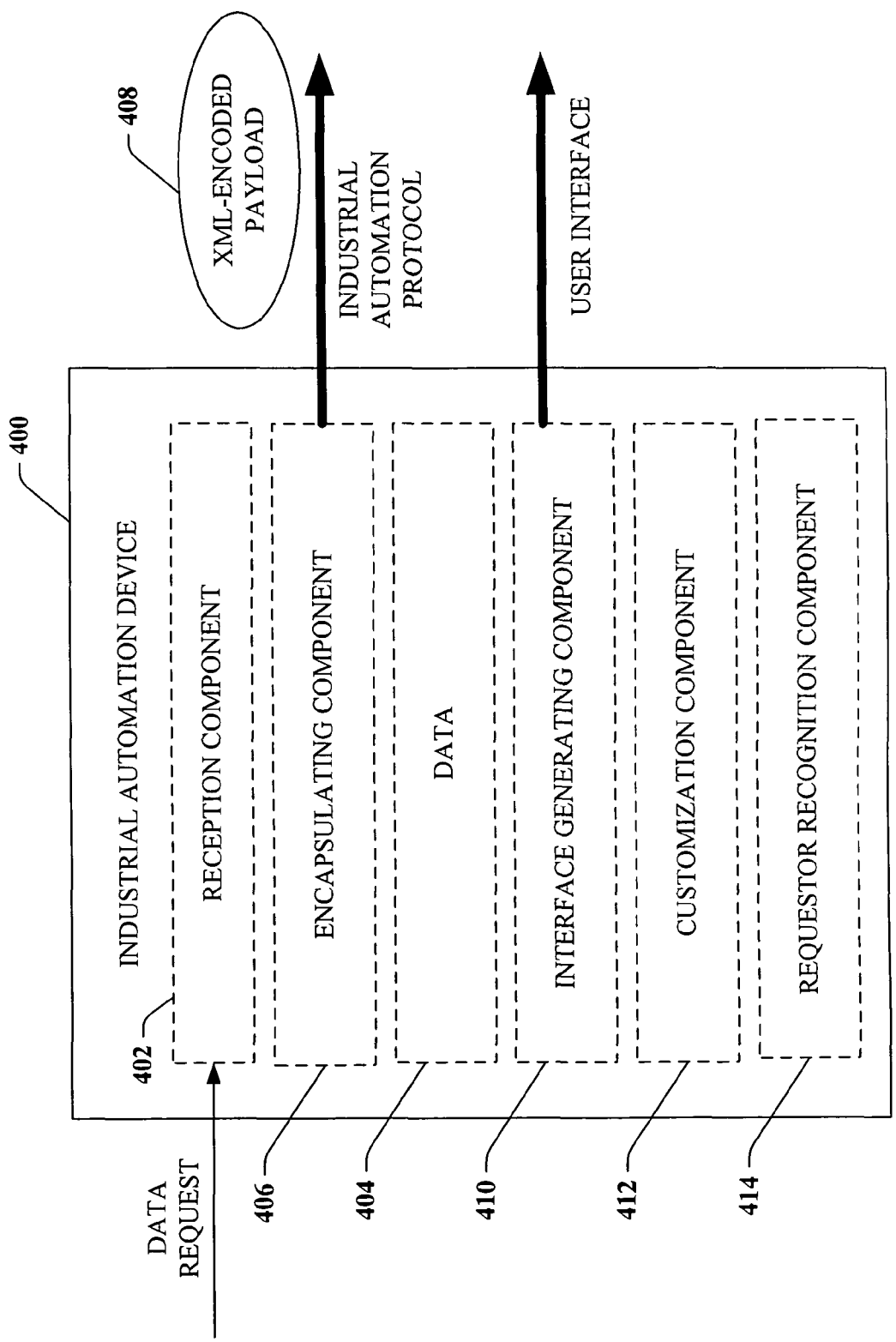
FIG. 4 illustrates an industrial automation device that can generate and transmit customized user interfaces by way of an industrial automation protocol.

Now turning to FIG. 4, an industrial automation device 400 is illustrated. The industrial automation device 400 includes a reception component 402 that receives a data request, wherein the requested data is existent within a data repository 404 within the industrial automation device 400. Upon receipt of the request by the reception component 402, the industrial automation device 400 can generate a binary bit stream associated with the data request, and such bit stream can be provided to an encoding component 406. In another example, a public attribute can be associated with the requested data, causing deliverance of a text stream to the encoding component 406. The text string can be descriptive of a classification scheme of the data 404, thereby enabling such data to be easily discovered by a user/entity. The encoding component 406 can generate an XML-encoded payload 408 upon receipt of the binary bit stream and the text string, and deliver such XML data over an industrial automation protocol, such as CIP. The XML-encoded payload 408 can thereafter be received by a user/entity.

The industrial automation device 400 can further include an interface generating component 410 that can automatically format/create data utilized to build a graphical user interface. For instance, a monitor (not shown) loaded with a web browser can be communicatively coupled to the interface generating component 410, and display a graphical user interface generated by such component 410. Thus, no custom mapping is necessary between the industrial automation device 400 and a monitor. Furthermore, as data is directly retrieved from the industrial automation device 400, customized interfaces can be easily generated. For example, the industrial automation device 400 can be a programmable logic controller, and an individual can request data relating to a pump controlled by such controller. Given sufficient supporting data within the textual bit stream, a graphical rendering of the pump can be generated within the industrial automation device 400 (in XML) and delivered to a monitor (which can include a browser that displays the interface). In contrast, generating graphical user interfaces in a conventional manner is a difficult task. For instance, a binary bit stream is received by a custom mapping component (external to the industrial automation device 400), which must interpret such binary data, transform the data into a format that can be utilized by a monitor, format the data so that it resides within a pre-defined interface shell, and various other operations. Utilizing the interface generating component 410, an interface can be automatically created within the industrial automation device 400 and passed over an industrial automation protocol to a monitor.

The industrial automation device 400 can also include a customization component 412 that enables at least portions of a user interface generated by the interface generating component 410 to be customized to a user's desires. For instance, a first user may wish to be provided data that is formatted in a first manner, and a second user may wish to be provided data that is formatted in a second manner. The customization component 412, through entry of particular information relating to graphical user interfaces by a user, can facilitate such customization of user interfaces. The customization component 412 can be associated with a requestor recognition component 414 that recognizes a user that is requesting data. Upon such recognition, the requestor recognition component 414 can provide a user identity to the customization component 412, which can in turn facilitate provision of a customized user interface to the user.

Figure 5:
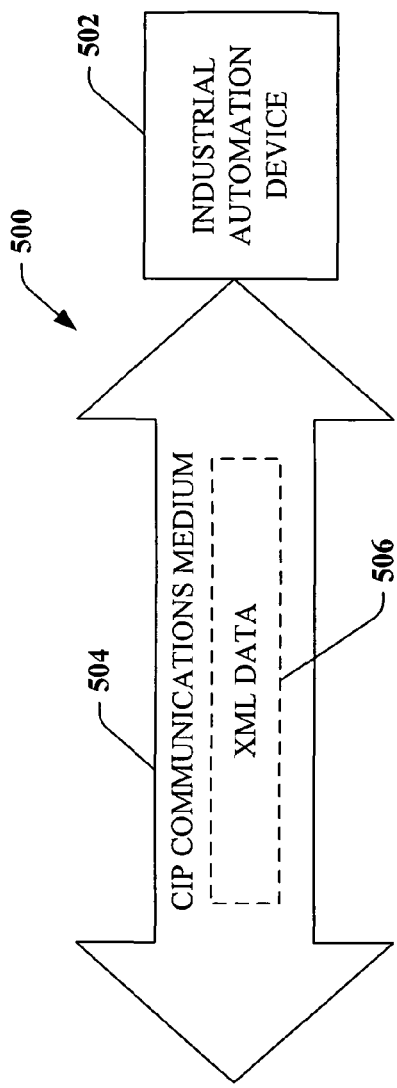
FIG. 5 illustrates an industrial automation network that facilitates communication of XML data over CIP.

Now referring to FIG. 5, an exemplary network 500 is illustrated. The network 500 includes an industrial automation device 502 that is associated with a CIP communications medium 504, which can be wireless, wirelined, or a combination thereof in nature. The CIP communications medium 504 can be configured to transfer XML data 506 to and from the industrial automation device 502. For instance, program data written in XML can be transferred to the industrial automation device 502 and utilized to program such device 502. Thus, the CIP communications medium 504 simply acts as a mechanism to deliver the XML data 506. For implementation, an XML object can be defined, wherein such object sits atop of the CIP protocol stack as an application object. A communication protocol data unit utilized to communicate with the XML object is also XML. Such network 500 can be employed to enable use of XML to program a controller as well as enabling devices that typically use Ethernet to be employed on an industrial automation protocol, such as ControlNet and DeviceNet, and have the XML delivered to the devices via CIP.

In another utilization of the network 500, the XML data 506 can be associated with Multipurpose Internet Mail Extensions (MIME) information as well as binary attachments. MIME defines mechanisms for sending disparate types of information than characters employed in the English language, such as 8-bit binary content including files containing images, sounds, movies, and programs. For example, the XML data 506 can be exchanged between a controller and a remote device by way of an OpenSocket interface, which leverages the XML data to frame a stream of traffic exchanged with a remote device. In another example, an XML SOAP message can be associated with a MIME encoded attachment as in the following example:

```
MIME-Version: 1.0
Content-Type: Multipart/Related; boundary=MIME_boundary;
type=text/xml; start='<mymessage.xml@example.org>'
Content-Description: A SOAP envelope containing a photo
--MIME_boundary
Content-Type: text/xml; charset=UTF-8
Content-Transfer-Encoding: 8bit
Content-ID: <mymessage.xml@example.org>
<soap11:Envelope
   xmlns:soap11='http://schemas.xmls.org/soap/envelope/'
   xmlns:xbinc='http://schemas.xmlsoap.org/2003/03/xbinc' >
  <soap11:Header>
    <xbinc:DoInclude
       soap11:actor='http://schemas.xmlsoap.org/soap/actor/next'
       soap11:mustUnderstand='false' />
  </soap11:Header>
  <soap11:Body>
    <d:Status xmlns:d='http://example.org/StatusExample' >
      <d:Name>LED Status</d:Name>
      <d:Photo xmlns:swa="http://schemas.xmlsoap.org/2003/03/swa"
           swa:MediaType='image/jpeg' >
        <xbinc:Include href='cid:http://example.org/Status.jpg' />
      </d:Photo>
    </d:Status>
  </soap11:Body>
</soap11:Envelope>
--MIME_boundary
Content-Type: image/jpeg
Content-Transfer-Encoding: binary
Content-ID: <http://example.org/Status.jpg>
fd a5 8a 29 aa 46 1b 24
--MIME_boundary--
```

Figure 6:
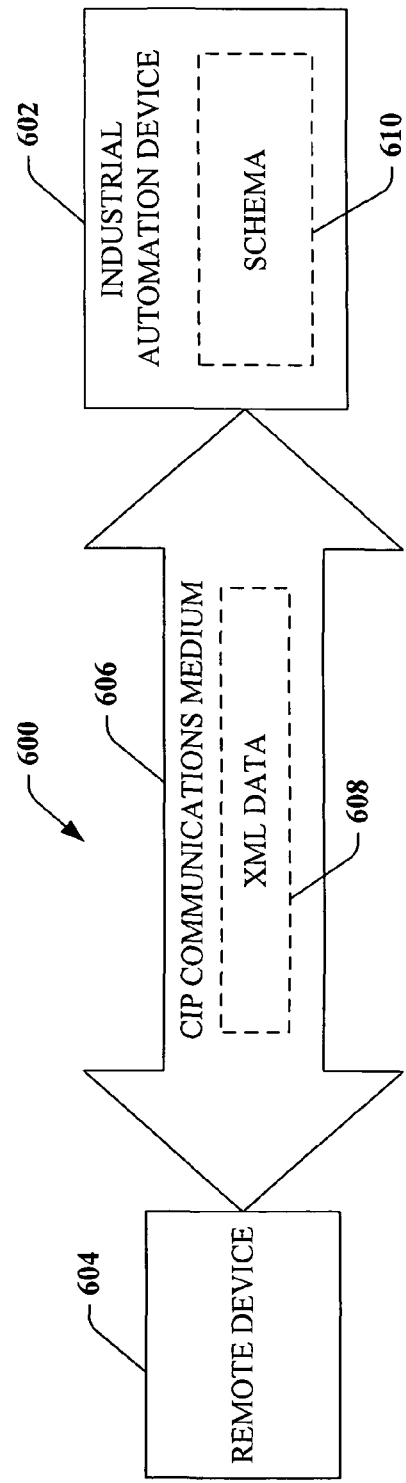
FIG. 6 illustrates an industrial automation network that facilitates discovery, testing, and validation of data within an industrial automation device by a client device.

Turning now to FIG. 6, a network 600 that can be employed in an industrial automation environment is illustrated. The network 600 includes an industrial automation device 602 and a remote device 604, which can exchange data over a CIP communications medium 606. The industrial automation device 602 can be a programmable logic controller or any other suitable computing device on a factory floor and the remote device 604 can be a personal computer, a server, another industrial automation device, or any other suitable device. The CIP communications medium 606 can be utilized to exchange XML data 608 between the industrial automation device 602 and the remote device 604. The industrial automation device 602 can include a schema 610 that can be accessed by the remote device 604, thereby enabling such remote device to discover format of the XML data 608 and test validity of a data structure that is consumed.

Figure 7:
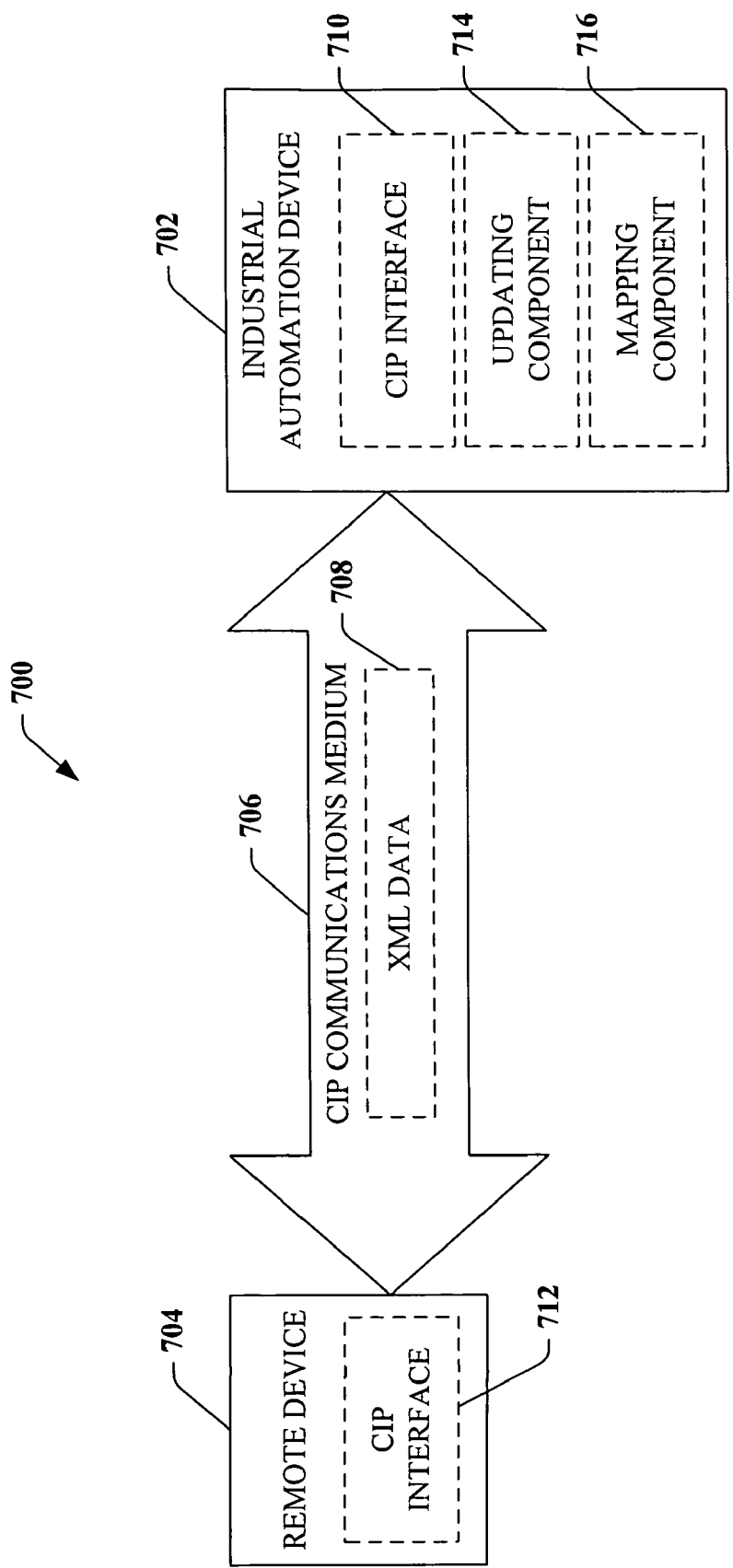
FIG. 7 illustrates a CIP communications medium that can transport XML data between disparate devices.

Turning now to FIG. 7, a network 700 that can be employed in an industrial automations environment is illustrated. The network 700 includes an industrial automation device 702 and a remote device 704 that can exchange data therebetween by way of a CIP communications medium 706. In more detail, the CIP communications medium 706 can be employed to transmit XML data 708 between the remote device 704 and the industrial automation device 702. The CIP communications medium, however, can transmit any suitable data format between the industrial automation device 702 and the remote device 704. For instance, the industrial automation device 702 can include various objects that typically accessed by way of CIP. The industrial automation device 702 and the remote device 704 include CIP interfaces 710 and 712, respectively, to facilitate communications between the two devices 702 and 704. Furthermore, while not shown, the XML data 708 can be appended with data that acts as a CIP interface. In accordance with one aspect described herein, at least one of the above-described CIP interfaces can be wrapped with standard web services, thereby enabling the remote device 704 to communicate with the industrial automation device 702 without regard to a transport mechanism employed for such communications.

One exemplary feature that can be offered as a web service is a software update, thereby enabling the industrial automation device 702 to be updated by the remote device 704 if the remote device is associated with particular security tokens and/or has necessary access privileges. To that end, an updating component 714 can be provided that facilitates updating of the industrial automation device 702. Moreover, if the industrial automation device 702 is a programmable logic controller, a web service can be utilized to drive mechanisms to read and write tags therein. Furthermore, the industrial automation device 702 can include various software objects that map a data model associated with CIP to CIP objects associated with web services. Thus, the industrial automation device 702 can include a mapping component 716 that facilitates the aforementioned mapping, as well as mapping of CIP binary data types into web data types (thereby enabling a tool to read up an XSD document from a device and understand what the data is as well as what the data means). Each of the software objects can present a unique Web Services Description Language (WSDL) to the mapping component 716 (or be contained in a larger WSDL covering services provided by at least part of the industrial automation device 702). For instance, the industrial automation device 702 can include an "identity" object that represents an identity of the industrial automation device 702, and the object can be associated with a particular format. A web service can be utilized that presents a complex data type that maps attributes of the CIP object (the "identity" object) as elements and attributes of web services parameters. Thus, if the "identity" object supports a CIP service such as "GetAttributesAll," then the "identity" object web service can provide a complex or simple data type in the namespace of the "identity" object as:

<Rev><ns:Major>1</ns:Major><ns:Minor>2</ns:Minor></Rev>

Furthermore, the industrial automation device 702 can present the web services into a registry (e.g., Universal Description, Discovery, and Integration (UDDI)) and include meta information such as quality of service, service level agreements, etc. Moreover, HMI terminals can leverage available control system data and present the data to users employing web services-based components. Such components can be, for example, ActiveX controls that connect utilizing standard web service mechanisms to automation devices to review data. One benefit of utilizing a web services transport is that such protocols flow through firewalls and can easily leverage common security infrastructure such as SSL connections, etc.

In more detail with respect to the web services that can be utilized in connection within the network 700, CIP data can be made available by way of web services in disparate manners. For instance, a web service can be placed within a binary bit stream in CIP together with an attachment. Thus, the data is made available over a web service, but the payload is substantially similar to a conventional CIP payload. In another example, the web service can break out CIP data by way of XML. For instance, rather than send a binary message, the CIP payload is in an XML markup, thus a human-readable form easily parsed with standard libraries can be generated. In summary, the web service can break out CIP data and alter the byte stream to an XML markup that is easily understood by receivers of the data. A WSDL example for such feature is provided below.

```xml
<?xml version="1.0"?>
<definitions name="CIPMessage"
targetNamespace="http://example.com/CIPMessage.wsdl"
xmlns:tns="http://example.com/CIPMessage.wsdl"
xmlns:xsd1="http://example.com/CIPMessage.xsd"
xmlns:soap="http://schemas.xmlsoap.org/wsdl/soap/"
xmlns="http://schemas.xmlsoap.org/wsdl/">
  <types>
    <schema targetNamespace="http://example.com/CIPMessage.xsd"
xmlns="http://www.w3.org/2000/10/XMLSchema">
      <element name="CIPMessageRequest">
        <complexType>
          <all>
            <element name="MessageRouterRequest" type="string"/>
          </all>
        </complexType>
      </element>
      <element name="CIPMessageResponse">
        <complexType>
          <all>
            <element name="MessageRouterResponse" type="string"/>
          </all>
        </complexType>
      </element>
    </schema>
  </types>
  <message name="CIPRequest">
    <part name="body" element="xsd1:CIPMessageRequest"/>
  </message>
  <message name="CIPResponse">
    <part name="body" element="xsd1:CIPMessageResponse"/>
  </message>
  <portType name="CIPPortType">
    <operation name="CIPMessage">
      <input message="tns:CIPRequest"/>
      <output message="tns:CIPResponse"/>
    </operation>
  </portType>
  <binding name="CIPMessageSoapBinding"
type="tns:CIPMessagePortType">
    <soap:binding style="document" transport=
"http://schemas.xmlsoap.org/soap/http"/>
    <operation name="CIPMessage">
      <soap:operation soapAction="http://192.168.1.10/CIPMessage"/>
      <input>
        <soap:body use="literal"/>
      </input>
      <output>
        <soap:body use="literal"/>
      </output>
    </operation>
  </binding>
  <service name="ControlInformationProtocol">
    <documentation>Implements Control and Information Protocol (CIP)
via Web Services</documentation>
    <port name="CIPPort" binding="tns:CIPMessageBinding">
      <soap:address location="http://example.com/CIPMessage"/>
    </port>
  </service>
</definitions>
```

Referring to FIGS. 8-12, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
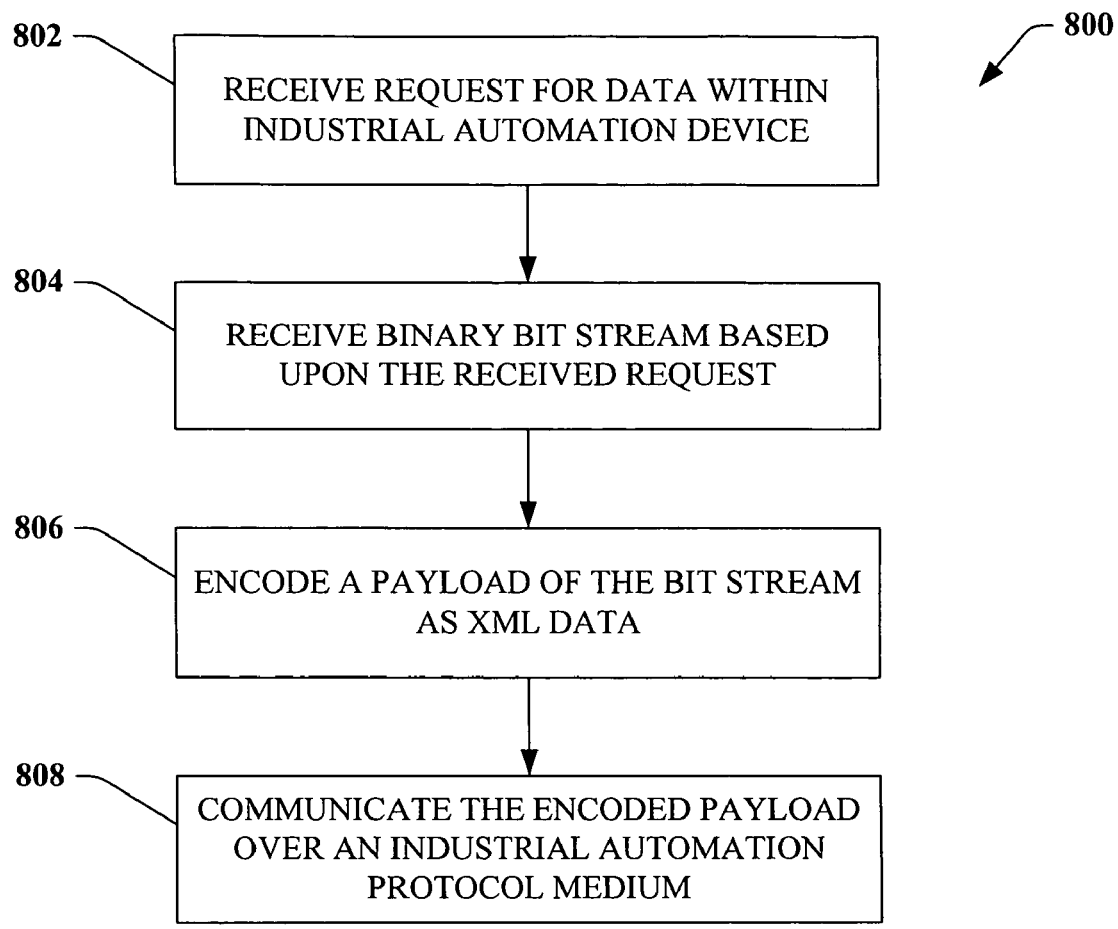
FIG. 8 illustrates a representative flow diagram illustrating a methodology for communicating encoded XML data over an industrial automation protocol.

Turning specifically to FIG. 8, a methodology 800 for transporting XML data over an industrial automation protocol is illustrated. At 802, a request for data within an industrial automation device is received. For instance, the industrial automation device can be a programmable logic controller or any other suitable factory-related devices. At 804, a binary bit stream is received based at least in part upon the data request. For instance, objects in conventional industrial automation devices are subject to a classification scheme. For example, "14.1.1.5" can indicate "service 14, object/class 1, instance 1, attribute 5." A request for such attribute can thereafter cause a binary stream of data to be generated. At 806, at least a portion of the binary bit stream can be encoded into an XML payload, and at 808 the XML payload can be communicated over an industrial automation protocol medium. For instance, the industrial automation protocol can be one or more of ControlNet, DeviceNet, EtherNet/IP, Hart, Foundation FieldBus, CIP, or any other suitable protocol.

Figure 9:
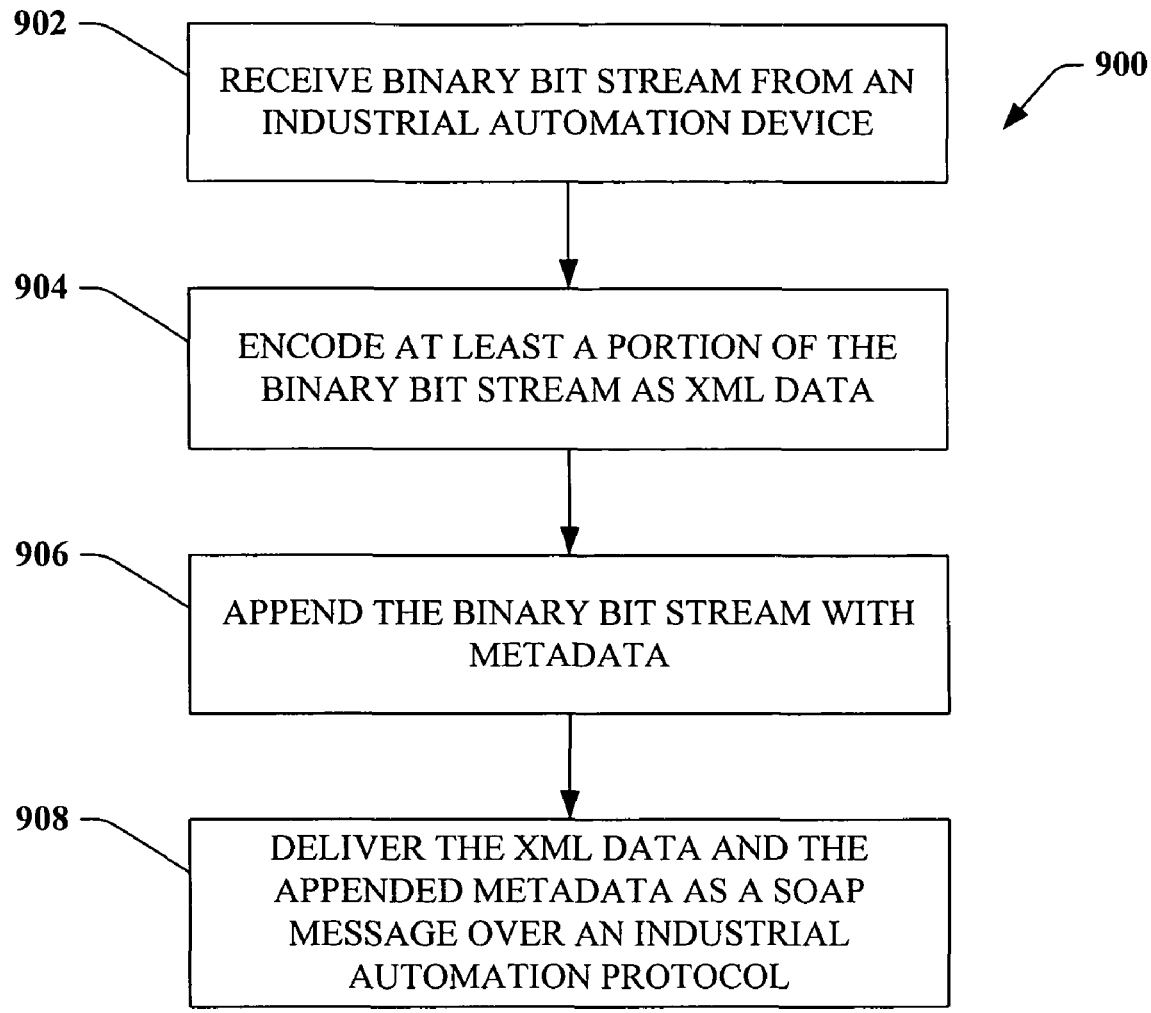
FIG. 9 illustrates a representative flow diagram illustrating a methodology for communicating a SOAP message with a MIME attachment over an industrial automation protocol.

Now referring to FIG. 9, a methodology 900 for delivering XML data by way of an industrial automation protocol is illustrated. At 902, a binary bit stream is received from an industrial automation device, and at 904 at least a portion of the binary bit stream is encoded as XML data. At 906, the binary bit stream and/or the XML data is appended with metadata. For instance, the metadata can be utilized to describe a schema of an object within the industrial automation device. In another example, the metadata can be attached as a MIME attachment. At 908, the XML data and the appended metadata (which can be in XML or any other suitable data format) can be delivered as a SOAP message over an industrial automation protocol.

Figure 10:
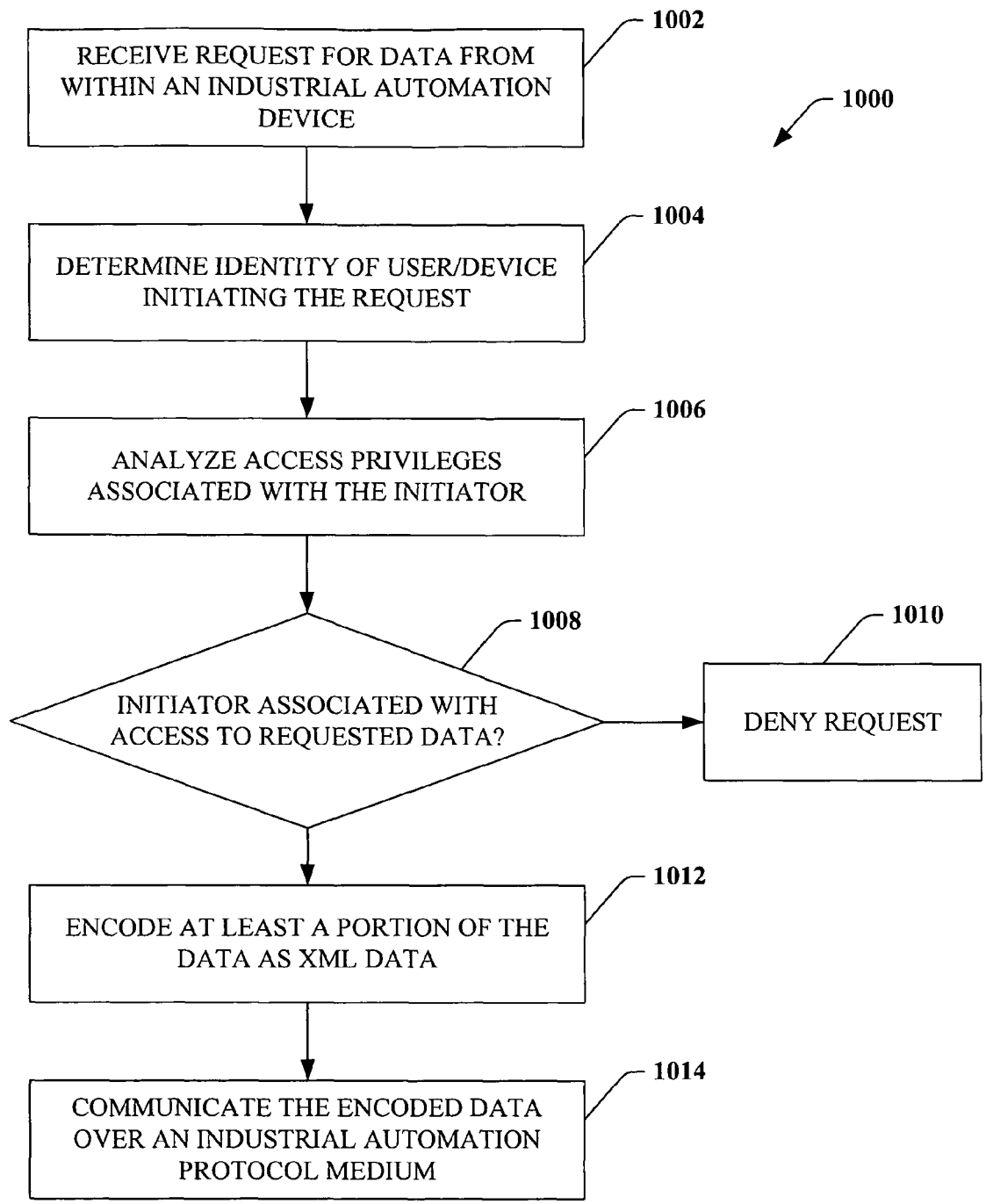
FIG. 10 illustrates a representative flow diagram illustrating a methodology for communicating an XML-encoded payload over an industrial automation protocol.

Now turning to FIG. 10, a methodology for communicating data over an industrial automation protocol is illustrated. At 1002, a request for data that is resident within an industrial automation device is received. For instance, the industrial automation device can be a programmable logic controller, and the data requested can relate to sensor/actuator status, identity of the controller, or any other suitable data. At 1004, an identity of the user/device initiating the request is determined. For example, a user can provide a username, password, PIN, biometric indicia, or the like to enable determination of an identity. Similarly, a device can provide a network address (e.g., a MAC address) or a unique identifier in connection with enabling determination of an identity.

At 1006, access privileges associated with the initiator of the request are analyzed. For instance, a user may have read only privileges (rather than read-write privileges) with respect to particular data. In another example, a user may not be associated with access privileges to requested data. At 1008, a determination is made regarding whether the initiator of the data request is associated with access to the requested data. If the initiator of the request is not associated with necessary access privileges, the data request is denied at 1010. If the initiator of the data request is associated with requisite permissions, then at 1012 at least a portion of the data is encoded as XML data, and at 1014 the XML-encoded data is communicated over an industrial automation protocol medium (e.g., cables, wireless mechanisms, . . . ).

Figure 11:
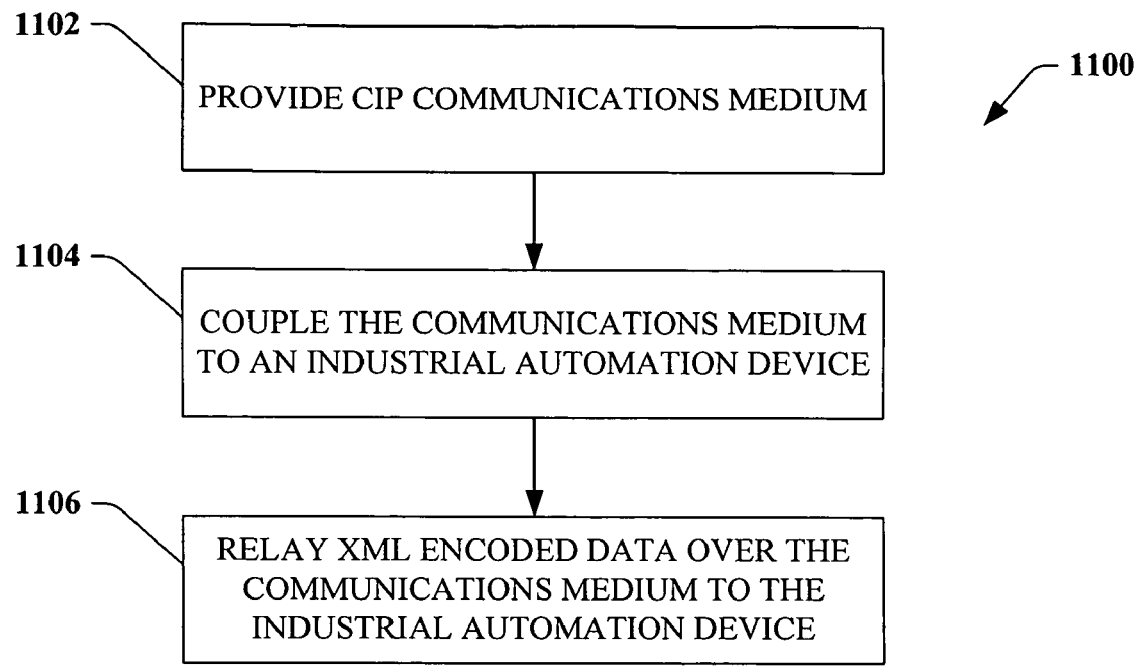
FIG. 11 illustrates a representative flow diagram for communicating XML data by way of CIP.

Now referring to FIG. 11, a methodology 1100 for exchanging XML data between devices in an industrial automation environment is illustrated. At 1102, a CIP communications medium is provided. For instance, cabling associated with CIP can be provided. In another example, wireless routers designed in accordance with CIP can be utilized as the CIP communications medium. At 1104, the communications medium is coupled to an industrial automation device, such as a programmable logic controller, a pump, a press, or any other device associated with processing capabilities and memory. At 1106, XML-encoded data is relayed over the CIP communications medium to/from the industrial automation device.

Figure 12:
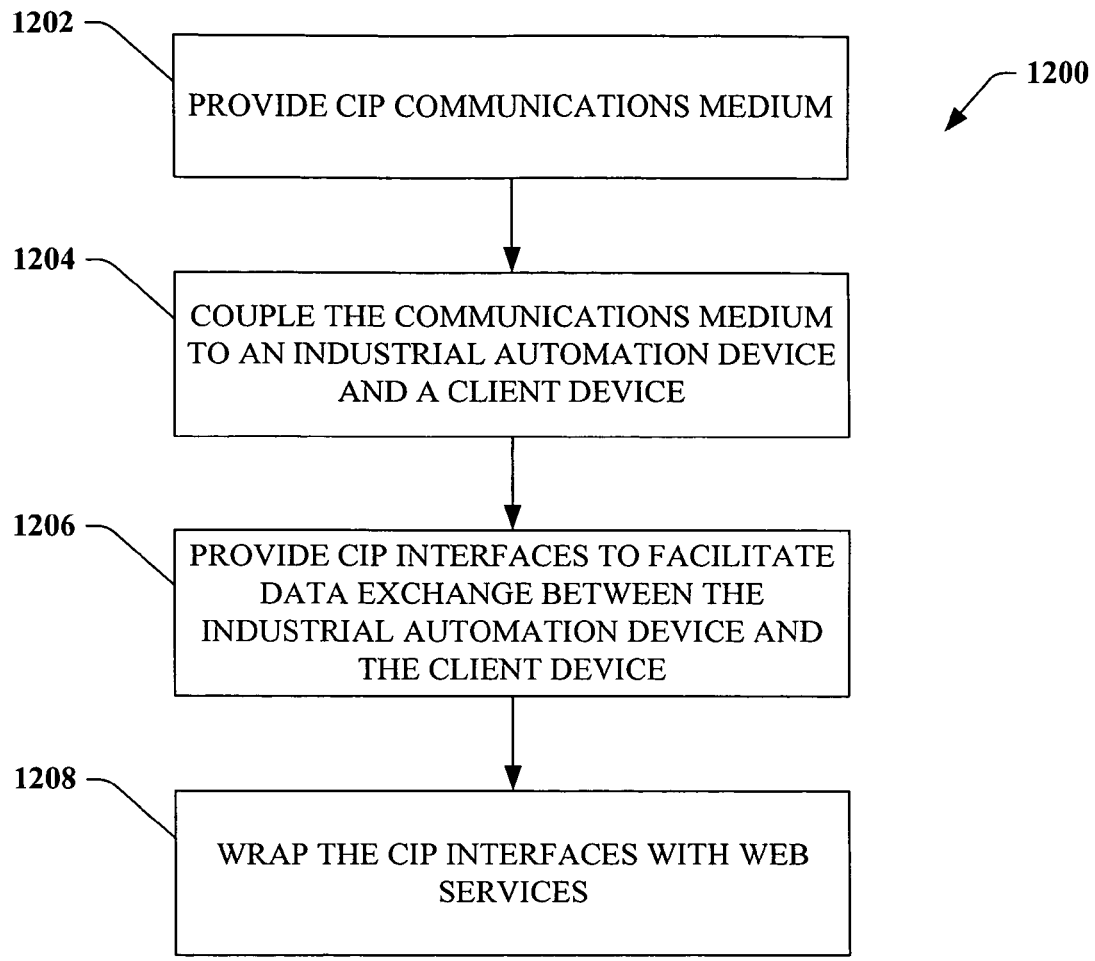
FIG. 12 illustrates a representative flow diagram for wrapping CIP interfaces with web services.

Turning now to FIG. 12, a methodology 1200 that facilitates utilizing web services in connection with CIP is illustrated. At 1202, a CIP communications medium is provided, and at 1204, the CIP communications medium is coupled to an industrial automation device and a client device. Thus, the industrial automation device and the client device can exchange data over the CIP communications medium. At 1206, CIP interfaces are provided to facilitate exchange of data between the two devices. For instance, the interfaces can be appendages to data delivered between the devices. At 1208, these interfaces are wrapped with web services. Thus, remote devices and software tools can communicate with CIP devices without having to think about a transport mechanism used for such communication.

Figure 13:
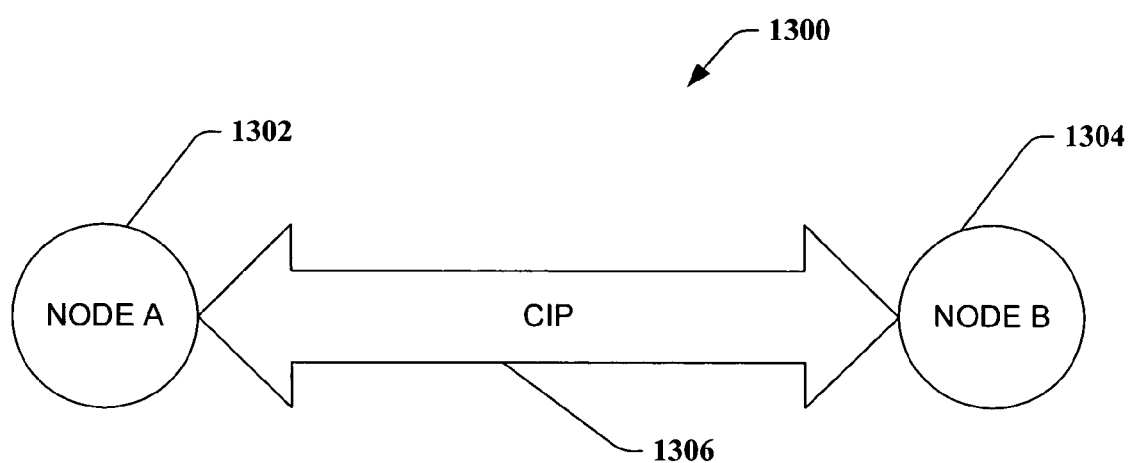
FIG. 13 illustrates communications delivered over CIP between disparate nodes.

Now referring to FIG. 13, a communications system 1300 that can be employed in an industrial automation environment is illustrated. The system 1300 includes node A 1302 and node B 1304, wherein the nodes 1302 and 1304 are communicatively coupled by way of a CIP connection 1306. In one example described above, node A 1302 can send and/or receive an XML markup of CIP data using the CIP protocol with respect to/from node B. If node B 1304 is the recipient of the XML markup, then such node 1304 can parse ASCII (or similar markup) instead of a binary bit stream (where particular bits have specific meaning known only to a select few). In another example, node A 1302 can send/receive XML with attached data using the CIP protocol to/from node B 1304. Attaching binary data to an XML message can increase performance with respect to particular devices. In still another example, node A 1302 can send/receive web services payload data to/from node B 1304 by way of the CIP connection 1306. Furthermore, CIP can provide a service that facilitates parsing XML data (e.g., through standard libraries). The web service payload can include information relating to different types of requests/responses.

If the nodes 1302 and 1304 were to lose the CIP stack but retain the CIP object model, then standard Ethernet can be employed to transport XML data. For example, if the object model is retained, the nodes 1302 and 1304 will have an identity object with a particular class code, but will not have a DeviceNet or ControlNet stack. In yet another example, node A 1302 and send/receive binary CIP data to node B 1304 by way of a web service. Thus, standard network stacks can be utilized for messaging, but benefits of the CIP object model will be retained. Furthermore, it is to be understood that the term "binary" in this instance means that the CIP stream does not need to be described—the data can be an ASCII string that represents binary data. In still another example, node A 1302 can send/receive XML markup of CIP data using web services to node B, where the binary CIP data is no longer a stream of text. In a final (but not limitative) example, node A 1302 can send/receive XML with attachments using web services to node B 1304, thus enabling the system 1300 to experience benefits of web services with binary performance attachments.

Figure 14:
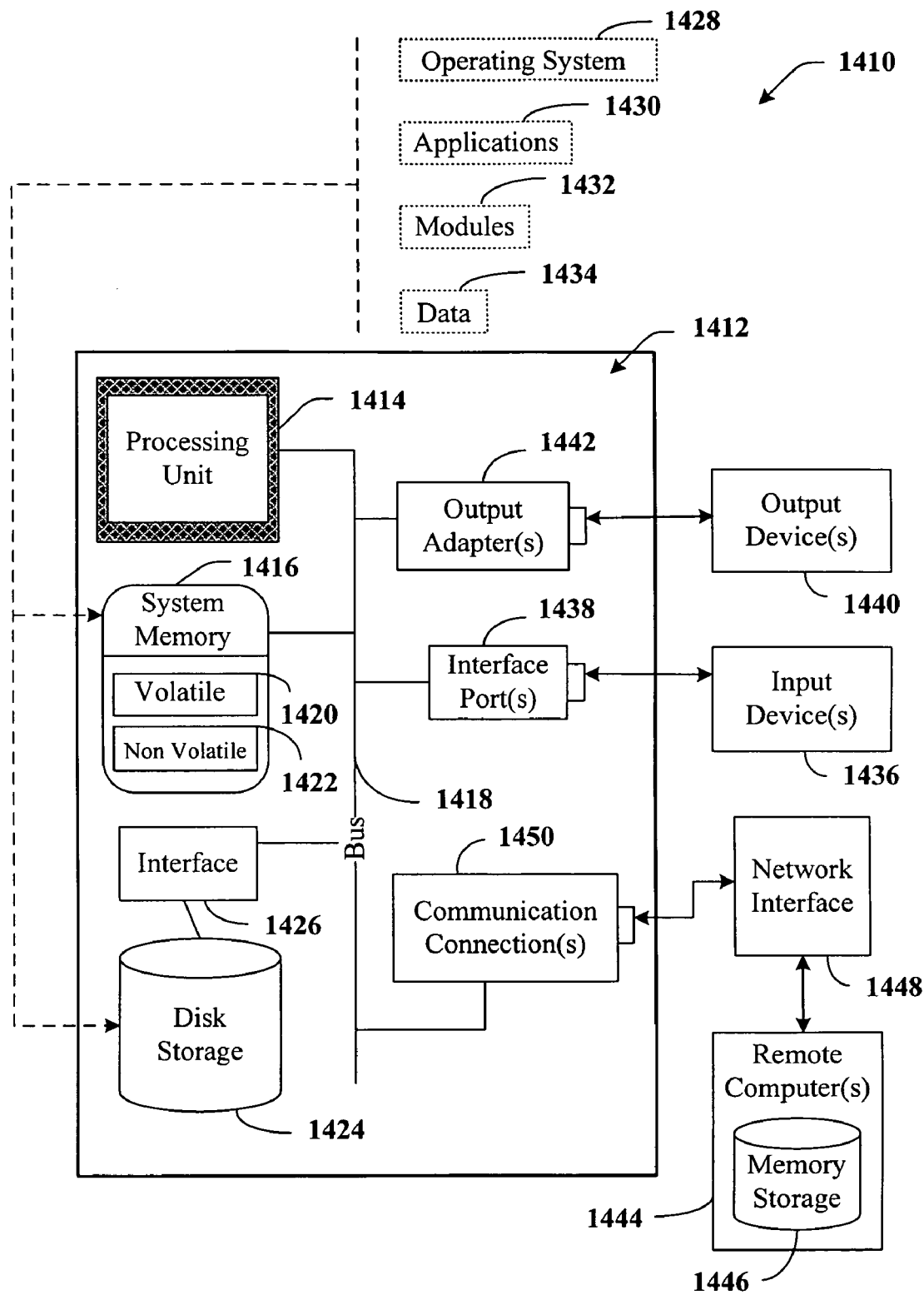
FIG. 14 is an exemplary computing environment that can be utilized in connection with the claimed subject matter.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
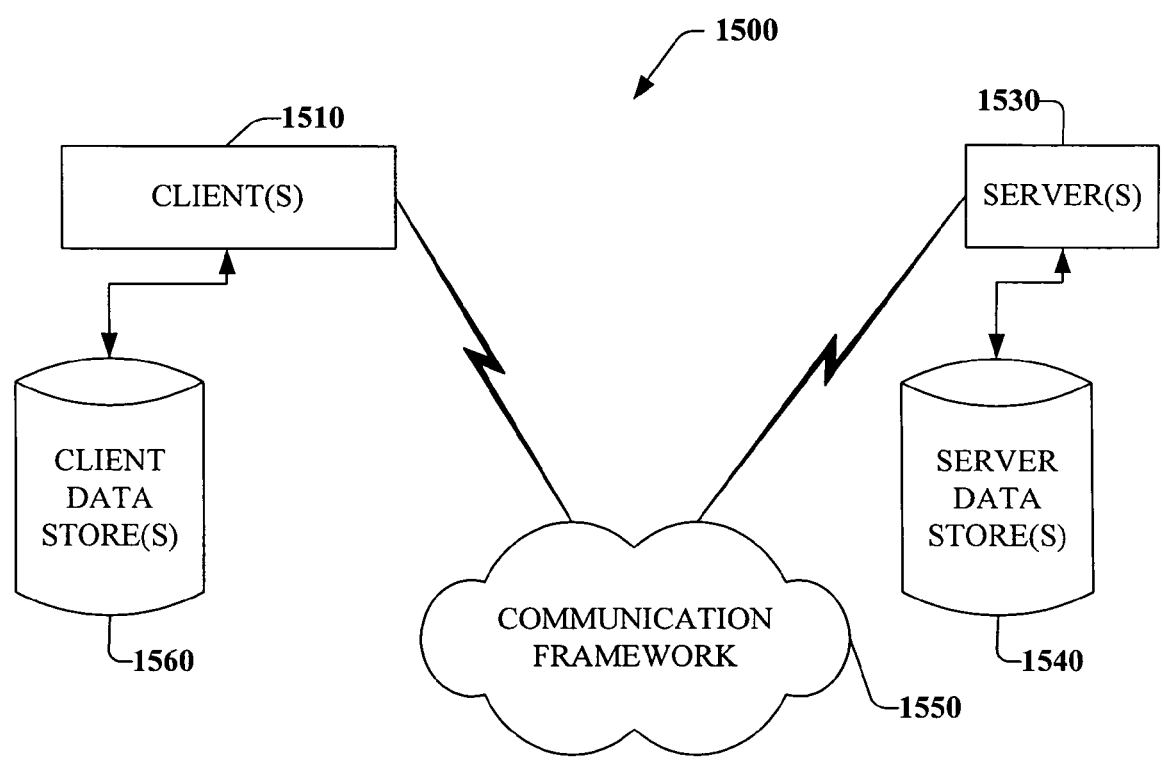
FIG. 15 is an exemplary computing configuration that can be utilized in connection with the claimed subject matter.

FIG. 15 is a schematic block diagram of a sample-computing environment 1500 with which the subject invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the subject invention, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation device, comprising:
    a reception component that receives a request for data resident within the industrial automation device, the requested data is a binary bit stream gathered from a device coupled to and controlled by the industrial automation device, the reception component further obtains a text string that describes information represented by at least one bit of data comprising the binary bit stream data referenced in the data request;
    an encoding component communicatively coupled to the reception component that receives the text string and the binary bit stream associated with the request and encodes at least a portion of the bit stream and at least a portion of the text string, and combines the encoded binary bit stream and text string as an extensible markup language (XML)-encoded payload, the encoding component further communicates the encoded payload by way of an industrial automation protocol;
    a mapping component that maps a data model associated with a control and information protocol (CIP) to CIP objects associated with a web service; and
    a user interface generating component that automatically generates a graphical user interface based at least in part upon the XML-encoded payload, the graphical user interface is formatted to facilitate rendering of the industrial automation device on a device remotely coupled to the industrial automation device, wherein the XML-encoded payload is wrapped according to the CIP for transmission from the industrial automation device to be parsed by the device remotely coupled to the industrial automation device.

2. The system of claim 1, the industrial automation protocol includes the Common Industrial Protocol.

3. The system of claim 1, the industrial automation protocol is one of DeviceNet, ControlNet, and EtherNet/internet protocol.

4. The system of claim 1, further comprising an XML object that resides above a stack of the industrial automation protocol and is utilized by the encoding component to encode the payload.

5. The system of claim 4, further comprising a communication protocol data unit (PDU) that communicates with the XML object based on XML.

6. The system of claim 1, further comprising a compression component that compresses the XML-encoded payload.

7. The system of claim 1, further comprising an appendage component that appends metadata to the binary bit stream.

8. The system of claim 7, further comprising a parsing component that parses the metadata.

9. The system of claim 8, the parsing component accesses a library in connection with parsing the metadata.

10. The system of claim 1, the binary bit stream is received upon recognition at the industrial automation device of a class attribute.

11. The system of claim 1, further comprising a security component that determines whether an initiator of the request is authorized to receive data included within the binary bit stream.

12. The system of claim 11, the security component utilizes one or more of a user name, password, and biometric indicia to determine whether the initiator of the request is authorized to receive the data.

13. The system of claim 1, further comprising a customization component that facilitates user-customization of at least one graphical user interface generated by the user interface generating component, each graphical user interface is customized specific to the formatting requirements of a user that is to receive the graphical user interface.

14. The system of claim 1, further comprising a requestor recognition component that recognizes an initiator of the request for data and encapsulates the data based at least in part upon the recognized initiator.

15. The system of claim 1, the encoding component encodes the binary bit stream in accordance with Simple Object Access Protocol (SOAP).

16. The system of claim 1, the encoding component encodes the binary bit stream in accordance with Simple Object Access Protocol (SOAP) with Multipurpose Internet Mail Extension (MIME).

17. A method for encoding and communicating extensible markup language (XML) data over an industrial automation protocol, comprising:
receiving a request for data that resides within an industrial automation device, the data is a binary bit stream gathered by a device coupled to and controlled by the industrial automation device;
receiving a text stream describing information represented by at least one bit of data of the binary bit stream associated with the request for data;
receiving the binary bit stream associated with the request for data;
encoding and combining at least a portion of the binary bit stream and at least a portion of the text stream to form an XML-encoded payload that contains sufficient information to graphically render the industrial automation device on a graphical user interface of a device remotely coupled to the industrial automation device;
mapping a data model associated with a control and information protocol (CIP) to CIP objects associated with a web service;
wrapping the XML-encoded payload according to the CIP for transmission from the industrial automation device to be parsed by the device remotely coupled to the industrial automation device; and
communicating the XML-encoded payload over an industrial automation protocol.

18. The method of claim 17, the industrial automation protocol is CIP.

19. The method of claim 17, the industrial automation protocol is one of DeviceNet, ControlNet, Ethernet/internet protocol, Hart, ProfiBus, ModBus, and Foundation Fieldbus.

20. The method of claim 17, further comprising wrapping interfaces associated with the industrial automation protocol with web services.

21. The method of claim 17, wherein the communicating the XML-encoded payload over the industrial automation protocol comprises communicating the XML-encoded payload as a Simple Object Access Protocol (SOAP) message with a Multipurpose Internet Mail Extension (MIME) attachment.

22. The method of claim 17, further comprising determining that an initiator of the request for data is associated with sufficient access privileges.

23. An industrial automation communication system, comprising:
means for receiving a request for data that resides within an industrial automation device, the data including a binary bit stream gathered by a device coupled to and controlled by the industrial automation device;
means for receiving a text stream that describes information contained in at least one bit of data of the binary bit stream associated with the request for data;
means for receiving the binary bit stream associated with the request for data;
means for encoding and combining at least a portion of the binary bit stream and at least a portion of the text stream as an extensible markup language (XML)-encoded payload that contains sufficient information to graphically render the industrial automation device on a graphical user interface of a device remotely coupled to the industrial automation device;
means for mapping a data model associated with a control and information protocol (CIP) to CIP objects associated with a web service;
means for wrapping the XML-encoded payload according to the CIP for transmission from the industrial automation device to be parsed by the device remotely coupled to the industrial automation device; and
means for communicating the XML-encoded payload over an industrial automation network.

24. The system of claim 23, further comprising means for wrapping interfaces associated with the industrial automation network with web services.

25. The system of claim 23, the XML-encoded payload is parsed by a client device.

* * * * *